F. W. MEYER.
SYSTEM OF CONTROL FOR INDUCTION MOTORS.
APPLICATION FILED MAR. 24, 1915.

1,275,966.

Patented Aug. 13, 1918.
2 SHEETS—SHEET 1.

WITNESSES:
R. J. Fitzgerald
D. C. Davis

INVENTOR
Friedrich W. Meyer.
BY
ATTORNEY

F. W. MEYER.
SYSTEM OF CONTROL FOR INDUCTION MOTORS.
APPLICATION FILED MAR. 24, 1915.

1,275,966.

Patented Aug. 13, 1918.
2 SHEETS—SHEET 2.

WITNESSES:
R. J. Fitzgerald
D. C. Davis

INVENTOR
Friedrich W. Meyer.
BY
Wesley G. Carr
ATTORNEY

UNITED STATES PATENT OFFICE.

FRIEDRICH W. MEYER, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL FOR INDUCTION-MOTORS.

1,275,966.      Specification of Letters Patent.      Patented Aug. 13, 1918.

Application filed March 24, 1915. Serial No. 16,675.

*To all whom it may concern:*

Be it known that I, FRIEDRICH W. MEYER, a subject of the Emperor of Germany, and a resident of Pittsburgh, in the county of Allegheny and State of Pennsylvania, have invented a new and useful Improvement in Systems of Control for Induction-Motors, of which the following is a specification.

My invention relates to methods of starting and operating poly-phase induction motors, and it has for its object to provide circuits and apparatus whereby, in operating a motor of the character designated from a single-phase supply circuit, a heavy starting torque may be obtained in a simple and efficient manner and whereby the motor may be subsequently operated over a wide speed range with little energy loss.

Figure 1:
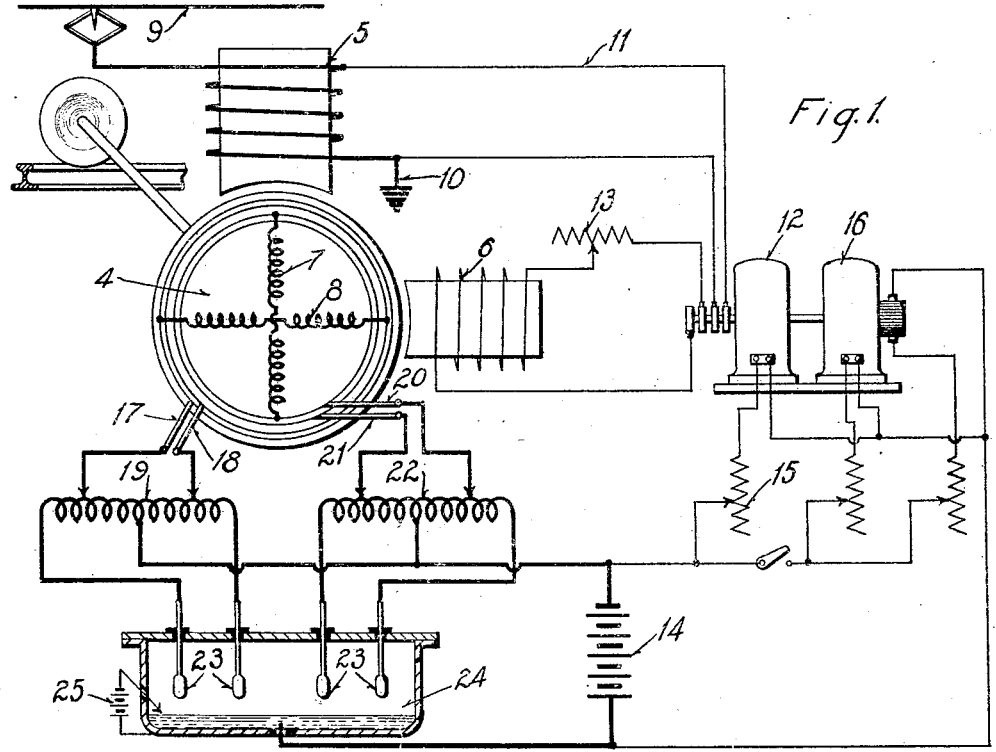
Figure 2:
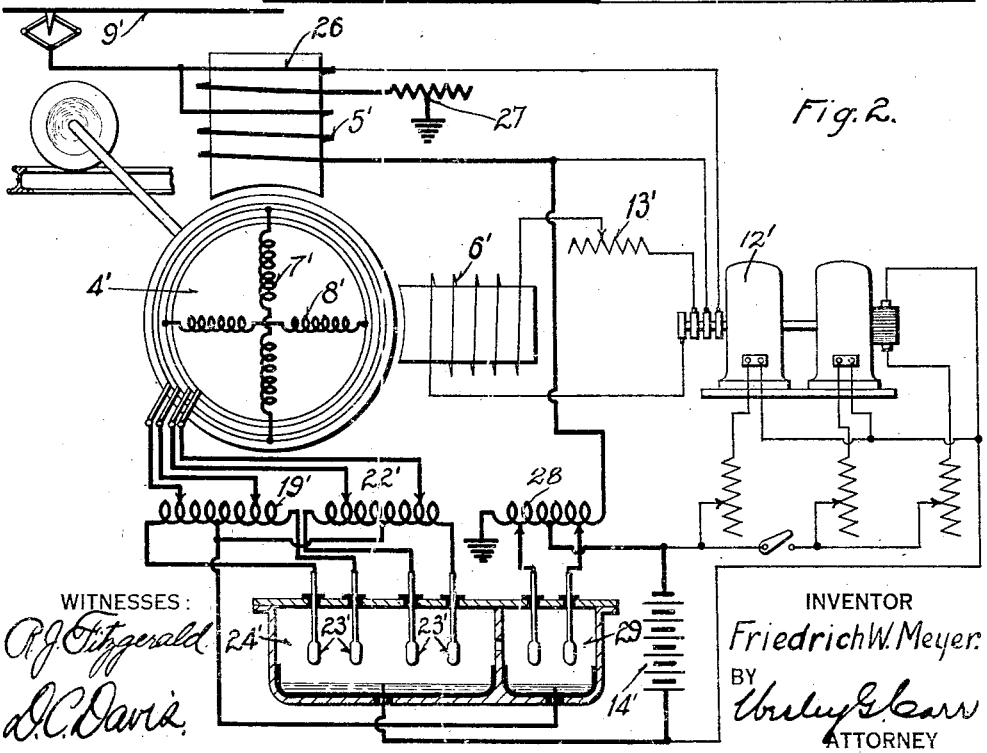
Figure 3:
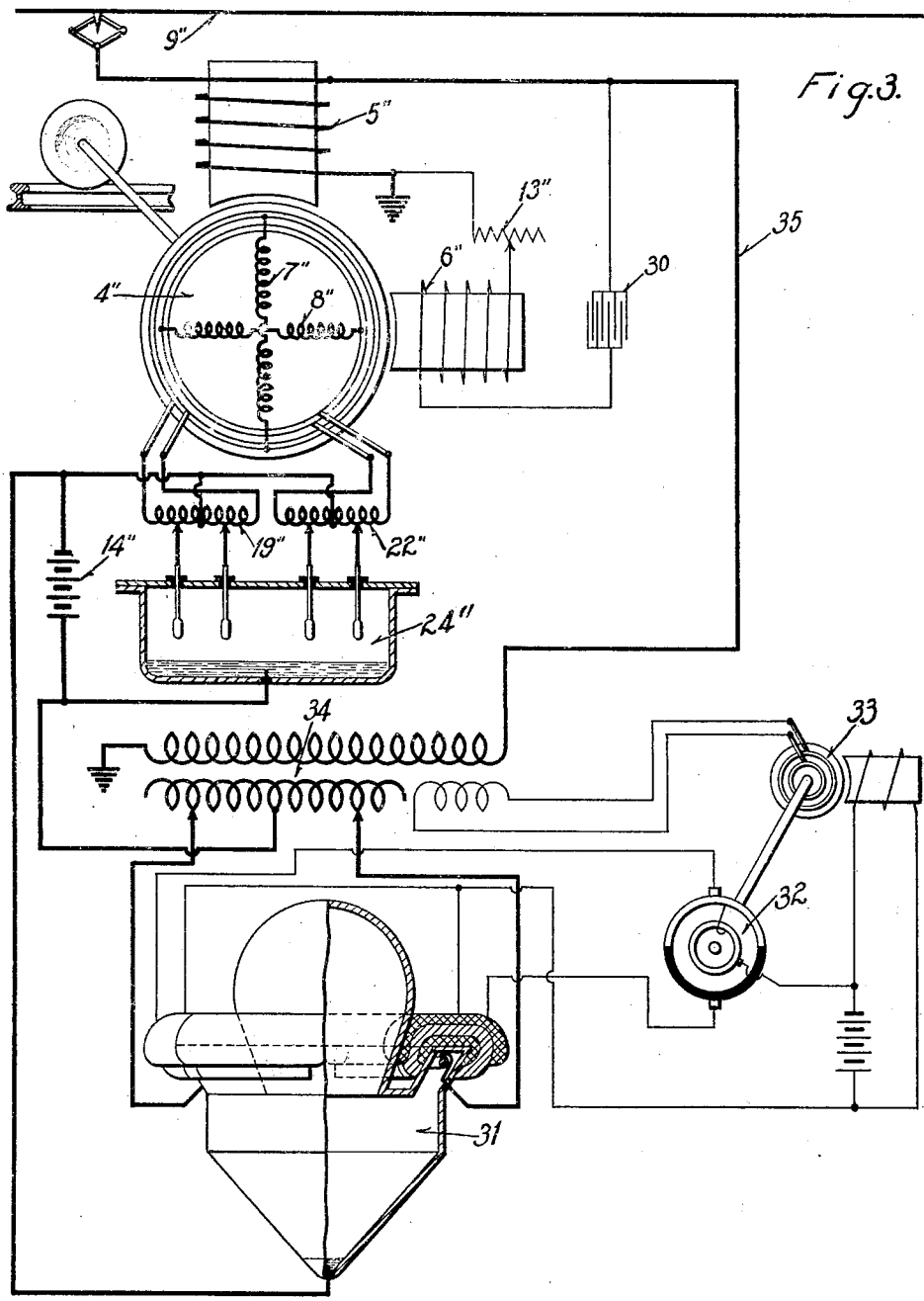

In the accompanying drawing, Figure 1 is a diagrammatic view of the electrical equipment of a railway vehicle constructed in accordance with my invention; and Figs. 2 and 3 are diagrammatic views of modifications of the apparatus shown in Fig. 1.

In the operation of electric railway systems, it is advisable to employ a single-phase high-voltage line for economy in transmission. Hitherto, it has been necessary, for heavy traction work, to employ polyphase motors with systems of this character and to supply said polyphase motors through a rather large and heavy phase splitter of the rotary type.

By my invention, I provide means whereby motors of the poly-phase type are employed with phase-shifting apparatus of relatively small dimensions for the energization of the field winding employing derived current, hereinafter termed the auxiliary winding. In the ordinary single-phase motor employing an auxiliary or split phase for starting, there is a tendency to transfer energy from the auxiliary field winding to the secondary member. As the phase-shifting device is generally of rather limited capacity, the phase conversion of a large amount of watt current results in an excessive voltage drop with a consequent weakening of the auxiliary field and a loss in starting torque. By my invention, I prevent the flow of watt current to the auxiliary winding by suitable means and am able to supply the magnetizing current thereto by phase-shifting apparatus of small current-carrying capacity.

Referring to Fig. 1 for a more detailed disclosure, a motor 4 of the poly-phase type is provided with a main field winding 5 and with an auxiliary field winding 6. The secondary member of the motor 4 is provided with a two-phase winding 7—8. In order to operate with the two-phase secondary windings, the main and auxiliary field windings have a mechanical displacement with respect to each other of 90°, as we are assuming the simplest case of a bipolar machine.

Energy, in the form of a single-phase current, is derived from a trolley line 9 and flows through the main field winding 5 to ground at 10, and suitable transformers may be employed for stepping down the line voltage if desired. Energy from the line 9 also flows through a wire 11 to a phase-converter 12 where it is displaced in phase by substantially 90° and supplied to the auxiliary field winding 6 through an adjustable rheostat 13. The phase converter 12 is preferably of the synchronous type and is therefore driven by watt current derived from the line and excited by direct current from a battery 14 through an adjustable rheostat 15 for power-factor correction. For starting purposes, the machine 12 is coupled, for example, to a direct-current motor 16 operated from the battery 14 or the motor 16 may drive the machine 12 continuously, depending upon synchronizing forces in the latter for the maintenance of synchronism.

The terminals of the phase winding 8 are connected to a pair of slip rings from which current is derived by brushes 17 and 18 and supplied to an adjustable transformer 19. In like manner, the terminals of the phase winding 7 are connected to a pair of slip rings from which current is derived by a pair of brushes 20 and 21 and supplied to an adjustable transformer 22. The terminals of the secondary windings of the transformers 19 and 22 are connected, respectively, to the anodes 23—23 of a rectifier 24, preferably of the vapor-arc type. The positive terminal of the battery 14 is connected to the cathode of the rectifier 24 and the negative terminal thereof is connected to the mid points of the transformers 19 and 22.

Having thus described the construction of my device, the operation is as follows: at the start, the main field winding 5 induces cur- rent in the phase windings 7 and, as the conductors of this phase winding lie in the field of the auxiliary field winding 6, a starting torque is produced. The strength of the field winding 5 is adjusted to such value that the electromotive force generated in the winding 7 will, after acting through the transformers 22, be sufficient to overcome the internal resistance of the rectifier 24 and the back-electromotive force of the battery 15 and cause current flow through the latter. Watt energy is therefore drawn from the winding 5 in any desired amount. Simultaneously with the above-described action, the flux of the auxiliary winding 6 will tend to induce current in the phase winding 8 and there will be a tendency for current so induced to produce torque by coaction with flux of the main field winding 5. The strength of the field 6, however, is regulated to a somewhat weaker value than that of the field winding 5 by means of the rheostat 13 and, accordingly, the electromotive force generated within the phase winding 8 will, after passage through the transformer 19, be incapable of causing current flow within the rectifier 24 because it is unable to overcome the back electromotive force of the battery 14. As a result, substantially no watt current will be derived from the winding 6, and only magnetizing current will flow therein. In order to more clearly explain the action of my device, I will point out more in detail the controlling action of the battery 14 through the rectifier 24. The cathode of the rectifier 24 is, at all times, maintained in active condition by a keep-alive circuit 25 and, therefore, when, for example, an arc is established from the right hand anode 23, a conducting path of low resistance is established through the rectifier 24, and the voltage of the battery 14 is impressed between the right hand terminal and the mid point of the secondary winding of the transformer 22. Current flow from the battery will not take place, however, because the negative-electrode reluctance of the anode is not broken down. If, however, one-half the voltage of the phase winding 7, after multiplication by the transformation ratio of the transformer 22, exceeds the voltage of the battery 14, current flow will take place to the battery. Particular attention is directed to the fact that the battery 14 exerts a voltage control back through the rectifier 24 upon the secondary phase voltages but that at the same time energy cannot flow back from the battery 14 to the secondary member.

Ninety electrical degrees later, the phase windings 7 and 8 will be interchanged in position, the winding 8 will derive watt current from the main field winding 5 and supply it to the battery 14 through the rectifier 24, and the phase winding 7, while in the proper position, will be unable to derive watt current from the auxiliary field winding 6. It will thus be seen that the operation of my device is similar to that of a machine wherein a phase winding, when inductively interlinked with a main field winding, would have its terminals connected through a low resistance and which, when inductively interlinked with an auxiliary field winding, would have its terminals connected through a high-resistance member. Obviously, a machine wherein the resistance in the secondary circuit varied in this manner would be difficult to construct but its operation would be analogous to my device. As a result of the above-described operation, the field winding 6 at no time supplies any but magnetizing flux to the secondary members and it therefore demands from the machine 12 and from the line 9 only a comparatively small amount of wattless current. The phase-converter 12 may, therefore, be much smaller and lighter than would be the phase splitter associated with an ordinary polyphase motor of like capacity.

Referring to the form of my invention shown in Fig. 2, a propulsion motor 4' is provided with a phase-wound secondary member, with a main field winding 5', an auxiliary field winding 6' and a phase splitter 12'. Upon the core with the main field winding 5' is wound a magnetizing field winding 26 in circuit with an adjustable rheostat 27. Current derived from the secondary member of the motor 4' is supplied to the left hand chamber of a compound rectifier 24'. Said rectifier differs from the ordinary rectifier only in having distinct sets of anodes for each of a plurality of circuits to be rectified, it being found that there is no energy interchange between said circuits if their only point of interlinkage is within the converter and in the rectified current path. The main field winding 5' is connected in series with a transformer 28, and current from the transformer 28 is rectified in the right hand chamber 29 of the rectifier 24'. The rectifying arcs within the two chambers of the rectifier 24' are connected in series with each other and with a storage battery 14', and there is, therefore, an equalizing action between the primary and secondary working currents of the motor 4', as described and claimed in my co-pending application, Serial No. 846,363, filed June 20, 1914, and assigned to the Westinghouse Electric & Manufacturing Company. While this particular construction forms no part of the present invention, it will be described for the sake of clearness. On reducing, for instance, the controlling current through the magnetizing winding 26 by means of the rheostat 27, the main field of the motor will become weakened and the back electromotive force induced in the winding 5' by the transformer action between the windings 5' and 26 will also be lowered. Since the voltage across the winding 5' and the primary member of the transformer member 28 is constant, a reduction of the back electromotive force in the winding 5' will increase the potential at the transformer 28, and, accordingly, raise the potential across the anodes within the rectifying chamber 29. Since the sum of the voltages across the two rectifying arcs is a constant, equal to the voltage of the battery 14', an increase of the voltage within the right hand chamber results in a reduction in the voltage within the left hand chamber, thus lowering the electromotive force of the secondary member of the motor 4', with a consequent adjustment of the speed. Less energy will be supplied by the secondary winding to the battery 14', and the difference in energy will be supplied from the transformer 28.

Referring to the form of my invention shown in Fig. 3, a propulsion motor 4" derives energy from a line 9" and is provided with a main field winding 5", an auxiliary field winding 6" and secondary phase windings 7" and 8". The phase of the current in the auxiliary field winding 6" is adjusted by a condenser 30. Energy derived from the secondary member of the motor 4" is supplied through a rectifier 24" to a de-rectifier 31 of the character described and claimed in my copending application, Serial No. 846,365, filed June 20, 1914, and assigned to the Westinghouse Electric & Manufacturing Company. Said de-rectifier comprises an evacuated container provided with a cathode and a plurality of anodes. A unidirectional current arc is initiated between one of said anodes and the cathode and said arc is then swept around by a suitable magnetic field so that it impinges in succession on each of the anodes. By proper connection of the anodes, the successive current impulses thus produced are combined to produce alternating current. A battery 14" floats across the unidirectional current circuit connecting the rectifier 24" and the de-rectifier 31. The alternating-current output of the de-rectifier is regulated to line frequency by a controlling switch 32 driven by a synchronous motor 33, is adjusted in voltage by a suitable transformer 34 and returned to the line through a wire 35. The speed regulation of the motor 4" may, therefore, be effected by adjusting the ratios of transformation of the transformers 19" and 22", and the excess energy derived from the rotor in the speed regulation thereof is returned to the line.

While I have shown and described my invention in three distinct embodiments, it is obvious to those skilled in the art that it is susceptible of various minor changes and modifications without departing from the spirit thereof and I desire, therefore, that only such restrictions shall be placed thereupon as are imposed by the prior art or are specifically set forth in the appended claims.

I claim as my invention:

1. The combination with a polyphase induction motor provided with main and auxiliary primary windings and with a phase-wound secondary winding, of means for supplying said auxiliary winding with current displaced in phase from that supplied to the main primary windings, and means for substantially preventing the flow of watt current to said auxiliary winding.

2. The combination with a polyhpase induction motor provided with main and auxiliary primary windings and with a phase-wound secondary winding, of means for supplying said auxiliary winding with current displaced in phase from that supplied to the main primary windings, and means associated with the secondary winding for substantially preventing the flow of watt current to said auxiliary winding.

3. The combination with a polyphase induction motor provided with main and auxiliary primary windings and with a phase-wound secondary winding, of means for supplying said auxiliary winding with current displaced in phase from that supplied to the main primary windings, means for adjusting the strength of the field produced by said auxiliary winding to a value less than that produced by the main field winding, and means dependent upon said field reduction for substantially preventing the flow of watt current to said auxiliary winding.

4. The combination with a polyphase induction motor comprising main and auxiliary primary windings and a phase wound polyphase secondary member, of means for energizing said auxiliary winding with current displaced in phase with respect to that supplied to the main field winding, means for adjusting the strength of the auxiliary field to a value less than that of the main field, and energy-absorbing circuits connected to the phases of the secondary member and adapted to absorb substantially no energy below a certain value of secondary voltage corresponding to a field strength intermediate between that of the main field winding and that of the auxiliary field winding.

5. The combination with a polyphase induction motor comprising main and auxiliary primary windings and a wound polyphase secondary member, of means for energizing said auxiliary winding with current displaced in phase with respect to that supplied to the main field winding, means for adjusting the strength of the auxiliary field to a value less than that of the main field, a source of substantially constant back electromotive force and asymmetric conductors connecting each phase of said secondary member to said source of back electromotive force, the magnitude whereof corresponds in value to the secondary electromotive force generated by a field intermediate in strength between the main and auxiliary fields.

6. The combination with a polyphase induction motor comprising main and auxiliary primary windings and a wound polyphase secondary member, of means for energizing said auxiliary winding with current displaced in phase with respect to that supplied to the main field winding, means for adjusting the strength of the auxiliary field to a value less than that of the main field, a source of substantially constant back electromotive force, and means for rectifying the current generated in each of the phases of said secondary member and for supplying said rectified current to said source of back electromotive force, the magnitude whereof corresponds in value to the secondary voltage that would be generated by a primary field intermediate in strength between the main and the auxiliary fields.

7. The combination with a polyphase motor having a phase-wound secondary member, of a supply circuit differing therefrom in phase number, a phase-converter, connections from said supply circuit directly to at least one phase of the primary winding of said motor, connections from said phase-converter to at least one other phase of the primary winding of said phase-converter, and means for limiting the flow of current from said phase-converter to substantially only magnetizing current.

In testimony whereof, I have hereunto subscribed my name this 12th day of March, 1915.

FRIEDRICH W. MEYER.

Witnesses:
D. C. DAVIS,
B. B. HINES.

Copies of this patent may be obtained for five cents each, by addressing the "Commissioner of Patents Washington, D. C."